United States Patent  [15] 3,702,367
Vollbrecht  [45] Nov. 7, 1972

[54] PROCESS AND ARRANGEMENT FOR STARTING REACTOR FOR REACTION OF FERROSILICON WITH GASEOUS HALOGENATION AGENT

[72] Inventor: Heinz-Rudiger Vollbrecht, Rheinfelden/Baden, Germany

[73] Assignee: Deutsch Gold-und-Silber-Schudeanstalt vormals Roessler, Frankfurt (Main), Germany

[22] Filed: March 19, 1971

[21] Appl. No.: 125,938

[52] U.S. Cl. ..................................13/23, 23/205
[51] Int. Cl. ...........................................H05b 3/60
[58] Field of Search ..........13/2, 20, 23; 263/77, 205

[56] References Cited

UNITED STATES PATENTS 3,161,501  12/1964  Southam.....................13/23 X
3,448,973  6/1969  Derham.......................13/23 X Primary Examiner—Roy N. Envall, Jr.
Attorney—Cushman, Darby & Cushman

[57] ABSTRACT

The reaction of ferrosilicon with a gaseous halogenation agent is started by flowing a protective gas upwardly through a ferrosilicon charge on a grate, conducting an electric current through the charge at least until a temperature of 200° C. is reached and then replacing the protective gas by the halogenation agent, e.g., hydrogen chloride gas, and stopping the flow of electric current as soon as the exothermic reaction is self-sustaining. An apparatus for carrying out this process is also disclosed.

6 Claims, 1 Drawing Figure

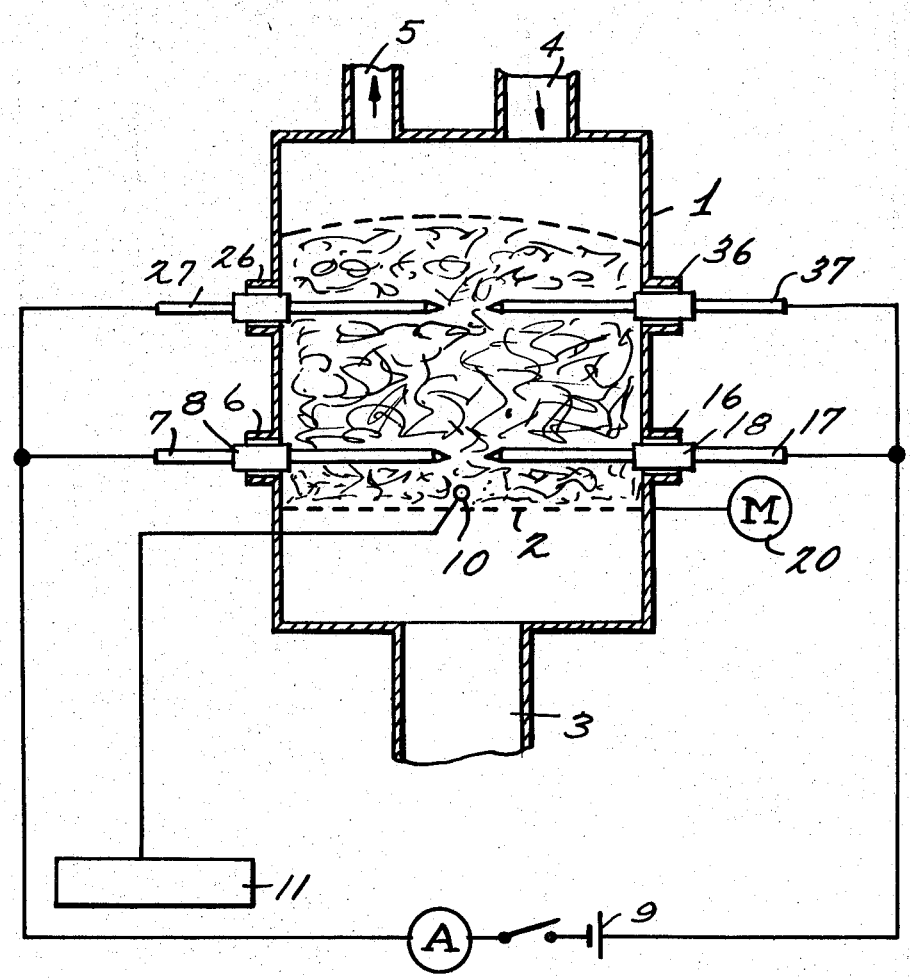

PROCESS AND ARRANGEMENT FOR STARTING REACTOR FOR REACTION OF FERROSILICON WITH GASEOUS HALOGENATION AGENT

The present invention relates to a process for starting a reactor for the reaction of the charge of ferrosilicon lumps with gaseous halogenation materials, preferably hydrogen chloride, although there can be used hydrogen bromide or hydrogen iodide, and an apparatus for carrying out this process.

Silicon halides, $SiX_4$, e.g., silicon tetrachloride, silicon tetrabromide and silicon tetraiodide and halosilanes, $SiH_nX_{4-n}$, where n is an integer of 1 to 3, e.g., silicochloroform, silicobromoform, silicofluoroform, silicoiodoform, dichlorosilane, dibromosilane, monochlorosilane and monobromosilane are valuable starting materials for the production of the silicon electronic grade, organo silicon compounds, pyrogenic silica, water repellant agents, etc. They can be produced by reaction of silicon or silicon alloys with gaseous halogens, e.g., chlorine, bromine, iodine or fluorine, or hydrogen halides at temperatures about 200° C. or above, at temperatures up to 1,500° C.

According to a known process the required silicon tetrachloride for the recovery of pyrogenic silica was produced by the reaction of 89 to 91 percent silicon-containing ferrosilicon with hydrogen chloride at temperatures of about 800° to 1,200° C. The reaction can be carried out continuously, for example, by charging from above with ferrosilicon lumps a closed reactor, circular in cross section, the reactor having a vibratory grate in its lower part. In the vicinity of the grate there are gas inlet conduits. A charging arrangement for ferrosilicon, as well as an exit conduit for the gaseous reaction products are located on the upper side of the reactor. Hydrogen chloride is led from below through the FeSi charge on the grate while discharging the ash formed in the exothermic halogenation reaction by vibrating the grate and drawing off the volatile halogenation products from the upper section of the reactor.

According to known starting processes the starting of the reactor occurs while a slender charge, e.g., about 250 mm. high, of ferrosilicon lumps, (e.g., grains of 80–150 mm.) is heated with the help of a hydrogen or oil burner to a temperature at which the exothermic reaction between the gaseous halogenation agent and ferrosilicon starts while the burner is mounted sideways on the reactor and the flame is allowed to sweep over the charge. This has the disadvantage that the steam occurring as a result of the oxidation of the fuel partially condenses in the region of the reactor and forms liquid acid with the subsequently added halogenation agent. This acid corrodes the reactor and besides, brings about silicification. A further disadvantage is that in soot-free burning of oil excess oxygen has to be used. In doing so, oxidation of the ferrosilicon surface easily occurs and thereby causes difficulties in the subsequent halogenation reaction. To avoid these disadvantages it has already been tried to bring the ferrosilicon to the necessary temperature by placing glowing charcoal thereon. Two difficulties are thereby encountered. If a good, thoroughly heatable, thin ferrosilicon layer is to be obtained the ferrosilicon added to the reactor after the start of the reaction can only be increased slowly up to the amount required for complete operation since a too quick increase of the amount fed regularly causes a cooling of the preheated starting layer below the starting temperature of the reaction. On the other hand, if one proceeds with a thicker ferrosilicon layer, then the preheating coal warms the upper part of this layer to such an extent that this reacts to completion and the reaction spreads to the ferrosilicon further added from above; the lumpy material which is underneath this starting layer remains preponderantly withdrawn from the reaction and blocks the grate because the reaction zone practically cannot spread against the gaseous reactants introduced from below the grate.

The necessary time until reaching full operation in the customary preheating process is considerable and in reactors with an hourly throughput of 100 kg. of ferrosilicon in the most favorable case amount to about 48 hours.

The invention is based on the problem of substituting a process for this expensive, time-consuming and additionally, still unsafe starting procedure for reactors for the reaction of ferrosilicon with gaseous halogenation agents. The process should produce, in a simple manner, a quick and reliable preheating of a vibratory grate reactor prefilled with a complete FeSi charge. A further problem is in the development of a suitable apparatus means for carrying out the process.

The first problem is solved according to the invention by a process consisting of flushing a charge of ferrosilicon lumps from below with a protective gas and also, at a downwards flowing place inside the charge, at least in a place near the grate, leading an electrical current through at least a portion of the cross section of the charge until the current flowing region of the charge has reached a temperature of at least 200° C. Thereupon the protective gas is either immediately, or gradually replaced by the gaseous halogenation agent and the current supply stopped as soon as the addition of the gaseous halogenation agent suffices to maintain the exothermic reaction in motion. The current flow can be supplied up to a maximum temperature of 1,500° C.

Any of the halogens or halogen halides mentioned previously can be used as the halogenation agent.

According to a preferred form of the process of the invention, the protective gas is replaced by hydrogen chloride gas at a temperature of the current flowing region of the charge between about 600° C. and 900° C., preferably about 800° C.

As protective gases it is possible to use an inert gas, preferably inert gases such as nitrogen. Other inert gases include argon, helium and carbon dioxide. For preheating the starting layer electrical current of a voltage such as is customarily employed for arc welding, e.g., 20 to 100 volts, can be employed.

For the start of the reaction it is sufficient to concentrate the current flow on a limited space inside the charge. In that way an approximately oval heat island is formed in the charge from which the reaction can progress quickly. The proportioning of the space is arranged according to the characteristics of the power source, it is empirically adjusted by this.

The temperature in the area of the charge where the current is flowing is best measured by a thermocouple element in a thermal protective tube.

The second problem on which the invention is based is solved by an arrangement for carrying out the process of the invention. This consists of a known closed reactor, circular in cross-section, and provided with a vibratory grate in its lower portion. Below the grate the reactor has gas inlet conduits and on its upper side there is a charging arrangement for ferrosilicon as well as an exit conduit for the gaseous reaction products. The arrangement, according to the device, is characterized by at least two wall ducts arranged above the grate in the reactor jacket, at least two of which are arranged near by the grate.

Through these wall openings insulated electrodes of conductive materials are led into the reactor, as well as at least one thermocouple in a thermal protective tube to the side of the ideal connecting line of opposite polar electrodes, preferably arranged near the grate.

Among others, electrodes of iron rods, tapered to a point in front, for example, of about 20 mm. diameter have shown good results. Their insulation against the metal jacket of the reactor can take place in an especially simple development of the invention by a wrapping of an asbestos ribbon in the area of their passage through the reactor jacket.

An especially trouble-proof and sufficiently exact measurement of temperature evolving in the area of the charge in which the electric current flows is made possible when the thermocouple is arranged about 10 – 20 cm. to the side of the ideal connecting line of two opposite polar electrodes.

The arrangement of the apparatus and the carrying out of the process of the invention will be further explained with the aid of the accompanying drawing and an illustrative example.

The single FIGURE of the drawing is a schematic illustration of the apparatus of the invention.

The abbreviation $Nm^3/h$ means Normal cubic meters per hour, i.e., the cubic meters per hour at standard temperature and pressure.

EXAMPLE

As shown in the drawings the apparatus consists of a closed reactor 1, circular in cross-section, which is provided with a vibratory grate 2, in its lower portion and which contains a charge of 89 to 91 percent ferrosilicon of a grain size of about 80–150 mm. (any suitable means can be used for vibrating the grate, e. g. the vibrating means disclosed in my copending application filed January 1970, entitled "Temperature Regulating Process for Vibratory Grate Reactors" corresponding to German application P 2 002 904.3). The vibratory grate is operatively connected to motor 20. Below the grate is a feed conduit 3, for the gaseous halogenation agent respectively the protective gas. On the upper side of the reactor are found a charging arrangement or conduit 4, for ferrosilicon as well as an exit conduit 5, for the gaseous reaction product. About 15 cm. above the grate are found, on opposite walls of the reactor, two wall openings 6 and 16. Through these openings the electrodes, 7 and 17, are carried into the reactor. The electrodes consist of iron rods, 20 mm. in diameter, tapered to a point in front. There is a distance of about 400 mm. between the points of the electrodes. They are electrically insulated against the wall openings, 6 and 16, by means of wrappings, 8 and 18, of an asbestos ribbon.

In the upper third of the charge there is analogously installed a corresponding electrode pair, 27 and 37. The opposite electrodes are connected with the poles of a power source, 9 (welding transformer). A thermocouple, 10, which is located in a thermal protective tube (not shown), is conducted from below between the bars of the grate about 20 mm. above the grate level. The heat sensitive part of the thermocouple is found about 13 cm. to the side of the ideal connecting line of the electrodes, 7 and 17, near the grate. The thermocouple, 10, is connected with a temperature indicating apparatus, 11.

The reactor containing the lumps of the ferrosilicon charge at the start of the operation is first flushed from below through gas inlet conduit, 3, with about 50 $Nm^3/h$ of nitrogen. Then there is applied to the electrodes a voltage of about 60 volts and a current of about 250 A. and the temperature observed on the indicating instrument. After reaching a temperature of about 800° C. the flow of nitrogen is replaced by a hydrogen chloride gas flow of about 40 $Nm^3/h$, which then is increased with rising temperature to the amount intended for operation, namely 300 $Nm^3/h$. Over the entire cross-section and over the entire height of the charge there is gradually developed a hot reaction zone of about 1,100° C. whereupon the starting device of the furnace is shut off. Thereupon the electrodes, 7, 17, 27 and 37 are removed from the reactor and the wall openings, 6, 16, 26 and 36, closed.

What is claimed is:

1. An apparatus for starting the reaction of a charge of ferrosilicon with a gaseous halogenation agent, said apparatus comprising a reactor, circular in cross-section, a vibratory grate in the lower portion of the reactor for holding a ferrosilicon charge, a gas inlet conduit below the grate, a conduit for charging ferrosilicon in the upper part of the reactor, a gaseous product exit conduit in the upper portion of the reactor, at least two openings in the reactor wall above the grate, at least two of said wall openings being near said grate, electrodes of electrically conductive material extending into said reactor through said wall openings and insulated from said walls, said two electrodes near said grate being connected to opposite poles of a source of electrical power, the ends of said electrodes within the reactor near the reactor grate determining an ideal connecting line of the opposite polar electrodes, and a protected thermocouple to the side of said ideal connecting line.

2. An apparatus according to claim 1 wherein the thermocouple is near the grate and the two electrodes near the grate are positioned on opposite sides of the wall.

3. An apparatus according to claim 1 wherein the electrodes are iron rods of about 20 mm. diameter and pointed in the front.

4. An apparatus according to claim 1 wherein the electrodes are insulated from the reactor wall by an asbestos covering.

5. An apparatus according to claim 1 wherein the thermocouple is located 10 to 20 cm. on the side of said ideal connecting line.

6. An apparatus according to claim 5 wherein there is provided a second pair of electrodes extending into said reactor above said two electrodes near said grate and said thermocouple is connected to a temperature indicating means.

* * * * *